US010355528B2

(12) United States Patent
Borin

(10) Patent No.: US 10,355,528 B2
(45) Date of Patent: Jul. 16, 2019

(54) DUAL COIL WIRELESS POWER TRANSMITTER

(71) Applicant: Aptiv Technologies Limited, St. Michael (BB)

(72) Inventor: Boris Borin, Willoughby Hills, OH (US)

(73) Assignee: APTIV TECHNOLOGIES LIMITED (BB)

(*) Notice: Subject to any disclaimer, the term of this patent is extended or adjusted under 35 U.S.C. 154(b) by 365 days.

(21) Appl. No.: 15/153,763

(22) Filed: May 13, 2016

(65) Prior Publication Data
US 2017/0033610 A1    Feb. 2, 2017

Related U.S. Application Data

(60) Provisional application No. 62/164,751, filed on May 21, 2015.

(51) Int. Cl.
*H02J 50/12* (2016.01)
*H01F 27/36* (2006.01)
*H01F 38/14* (2006.01)
*H02J 50/40* (2016.01)

(52) U.S. Cl.
CPC .......... *H02J 50/12* (2016.02); *H01F 27/365* (2013.01); *H01F 38/14* (2013.01); *H02J 50/40* (2016.02)

(58) Field of Classification Search
CPC ......... H02J 50/12; H02J 50/40; H01F 27/365; H01F 38/14
See application file for complete search history.

(56) References Cited

U.S. PATENT DOCUMENTS

| 9,697,459 | B2* | 7/2017 | Finn | B23K 26/361 |
| 2012/0248889 | A1* | 10/2012 | Fukushi | H02J 17/00 307/104 |
| 2013/0075477 | A1* | 3/2013 | Finn | G06K 19/07794 235/492 |
| 2014/0015329 | A1* | 1/2014 | Widmer | G01D 5/2006 307/104 |

(Continued)

FOREIGN PATENT DOCUMENTS

| DE | 102011014752 A1 | 9/2012 |
| EP | 2648274 A1 | 10/2013 |

(Continued)

*Primary Examiner* — Jared Fureman
*Assistant Examiner* — Emmanuel R Dominique
(74) *Attorney, Agent, or Firm* — Robert J. Myers

(57) ABSTRACT

A transmit coil assembly configured to transmit two different alternating magnetic fields having different frequencies is provided. The transmit coil assembly includes a first transmit coil set configured to resonate within a first frequency range and a second transmit coil set configured to resonate within a second frequency range which is outside the first frequency range and at least ten times higher or lower than the first frequency range. The assembly also includes a ferrite element; and a housing formed of a conductive material in which the first transmit coil set, the second transmit coil set, and the ferrite element are disposed. The ferrite element is disposed intermediate the first transmit coil set and the housing and is configured to provide magnetic shielding substantially for the first transmit coil set.

5 Claims, 4 Drawing Sheets

(56) References Cited

U.S. PATENT DOCUMENTS

| | | | | |
|---|---|---|---|---|
| 2014/0168019 A1* | 6/2014 | Hirobe | ............... | H01Q 5/40 |
| | | | | 343/720 |
| 2014/0266030 A1 | 9/2014 | Park et al. | | |
| 2014/0320369 A1* | 10/2014 | Azenui | ............... | H01Q 1/526 |
| | | | | 343/841 |
| 2015/0115723 A1* | 4/2015 | Levo | ............... | H01F 27/365 |
| | | | | 307/104 |
| 2015/0130979 A1* | 5/2015 | Huang | ............... | H01F 38/14 |
| | | | | 348/333.01 |
| 2015/0145634 A1* | 5/2015 | Kurz | ............... | H01F 38/14 |
| | | | | 336/232 |
| 2015/0145635 A1* | 5/2015 | Kurz | ............... | H01F 38/14 |
| | | | | 336/232 |
| 2015/0280450 A1* | 10/2015 | Park | ............... | H02J 7/025 |
| | | | | 307/104 |

FOREIGN PATENT DOCUMENTS

| | | |
|---|---|---|
| EP | 2811614 A2 | 12/2014 |
| JP | 2013084915 A | 5/2013 |

\* cited by examiner

DUAL COIL WIRELESS POWER TRANSMITTER

CROSS-REFERENCE TO RELATED APPLICATION

This application claims the benefit under 35 U.S.C. § 119(e) of U.S. Provisional Patent Application No. 62/164,751, filed on May 21, 2015, the entire disclosure of which is hereby incorporated by reference.

TECHNICAL FIELD OF THE INVENTION

The invention relates to wireless power transmission, particularly a transmitter having two sets of transmit coils configured to resonate at different frequencies.

BACKGROUND OF THE INVENTION

In wireless power delivery systems, composed of a transmitter and one or more receivers (hereafter referred to as the "system") that rely on an electrical inductor (hereafter referred to as the "transmit coil") to generate an electromagnetic field that couples to a secondary inductor (hereafter referred to as the "receive coil"). The addition or subtraction of metallic items such as wires, screws, paper clips, or other material that may conduct electrical charge in the presence of an electromagnetic field (hereafter referred to as "parasitic items") will change the system prior to the addition or subtraction of these parasitic items (hereafter referred to as the "environment") more specifically the electrical impedance of the transmit coil and/or receive coil. This change will negatively affect some, or all of the following: the ability to deliver power wirelessly to the receiver, the efficiency at which power is delivered to the receiver, other electrical or wireless systems due to interference, and the positional freedom of wireless power delivery (hereafter referred to as "performance"). One method to minimize the effects of parasitic items on performance is to incorporate a magnetic shield, such as a sheet of ferrite and/or metallic material, underneath the transmit coil and/or above the receive coil. This prevents degradation of performance when parasitic items are placed above the receive coil and/or below the transmit coil.

When designing a system with two transmit coils, where one coil is used to generate an electromagnetic field with a fundamental frequency at least one order of magnitude higher or lower than the fundamental frequency for which the coil has been designed, magnetic shielding that can function over both sets of frequencies is desired. In addition, the magnetic shielding must provide adequate shielding for both transmit coils. This is limiting in that the wide range of frequencies may offer few choices of material for effective magnetic shielding, and the magnetic shielding may affect electrical impedance of a receive coil that, in turn, degrades performance of the system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with an embodiment of the invention, a transmit coil assembly configured to transmit two different alternating magnetic fields having different frequencies is provided. The transmit coil assembly includes a first transmit coil set configured to resonate within a first frequency range and a second transmit coil set configured to resonate within a second frequency range which is outside the first frequency range and at least ten times higher or lower than the first frequency range. The assembly also includes a ferrite element; and a housing formed of a conductive material in which the first transmit coil set, the second transmit coil set, and the ferrite element are disposed. The ferrite element is disposed intermediate the first transmit coil set and the housing and is configured to provide magnetic shielding substantially for the first transmit coil set.

The coil assembly may further include a printed circuit board. The first and second transmit coil sets may be formed by conductive traces on the printed circuit board. The coil assembly may further include a spacer element disposed intermediate the second transmit coil set and the housing.

According to one embodiment, the spacer element is formed of a dielectric material and the housing provides magnetic shielding substantially for the second transmit coil set. In this embodiment, the ferrite element may be disposed so that it is not intermediate the second transmit coil set and the housing. The coil assembly may further include a second ferrite element disposed intermediate the spacer and the housing.

According to another embodiment, at least a portion of the spacer element may be formed of a ferrite material and the spacer element provides magnetic shielding substantially for the second transmit coil set.

The first coil may be spaced less than 1 mm away from the housing and the second transmit coil set may be spaced at least 3 mm away from the housing.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

The problem of designing a wireless power transmitter system with multiple coils, where a first transmit coil set supports an operating frequency range that is at least an order of magnitude higher or lower than the second transmit coil set may be solved by magnetic shielding the first transmit coil set with a ferrite shield suited for the first transmit coil set and magnetic shielding the second transmit coil set with aluminum or copper spaced from the second transmit coil set by materials not considered parasitic items, such as plastic, nylon or air. This may be addressed by creating a large gap (e.g. more than 3 mm) between the housing and the second transmit coil set and a small or no gap (less than 1 mm) between the housing and the first transmit coil set. This allows for improvement of performance by allowing magnetic shielding to be selected for the first and second transmit coil sets independently.

Figure 1:
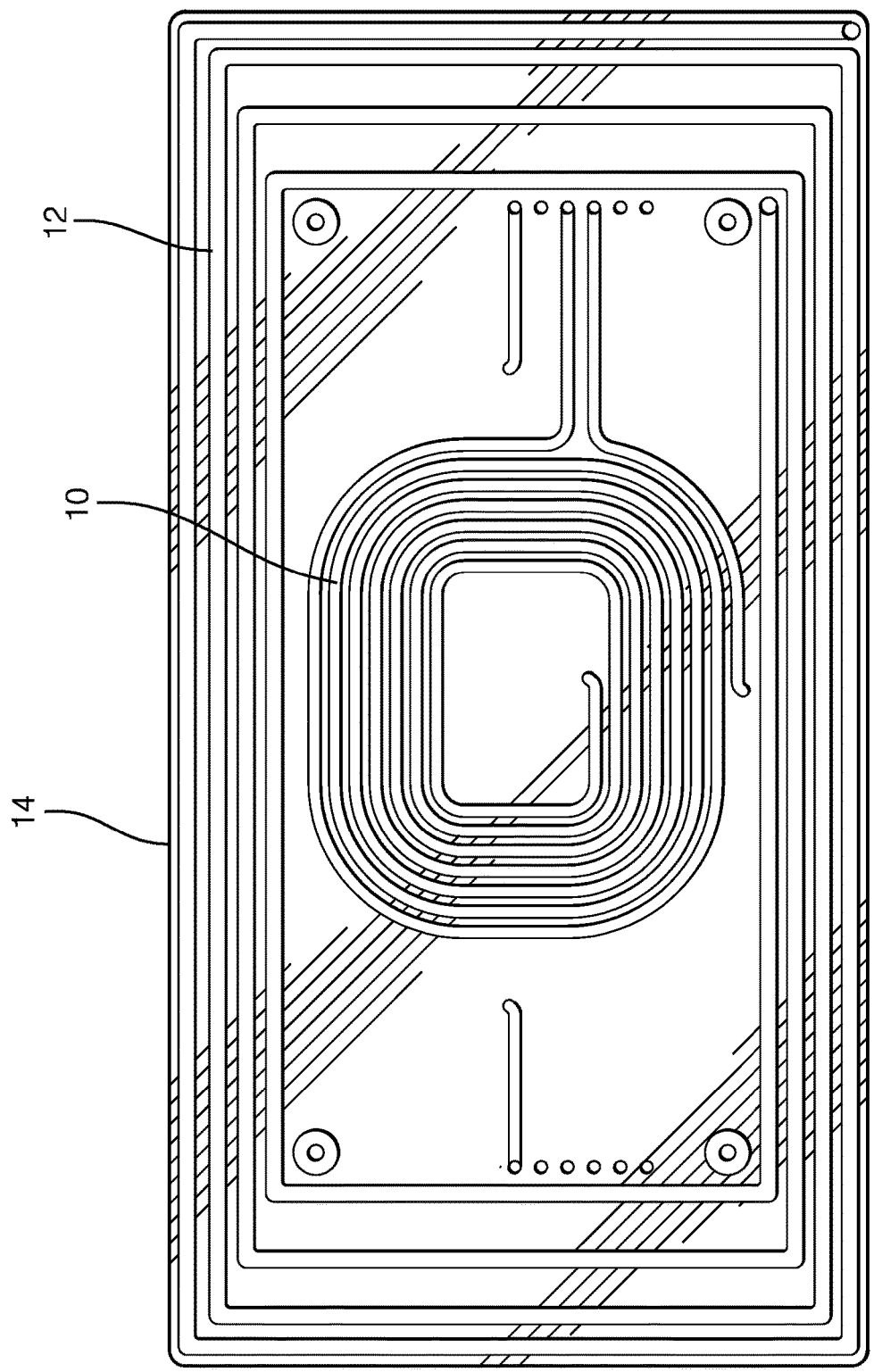
FIG. 1 is a top view of a printed circuit board on which a first and second transmit coil set are formed according to one embodiment.

FIG. 1 shows a non-limiting example of a first transmit coil set 10 and a second transmit coil set 12 formed by conductive traces on a printed circuit board 14 where a first transmit coil set 10 operates at a frequency that is substantially different from a frequency at which a second transmit coil set 12 operates. The first transmit coil set 10 is configured to resonate in a first fundamental frequency range and a second transmit coil set 12 is configured to resonate in a second fundamental frequency range. The second fundamental frequency range is outside of the first fundamental frequency range and is at least one order of magnitude, i.e., ten times, higher or lower than the first fundamental frequency. As used herein, the first transmit coil set 10 is configured to resonate in a first fundamental frequency range when the Q factor of the first coil set 10 is greater than 0.5 within the first fundamental frequency range. Likewise, as used herein, the second transmit coil set 12 is configured to resonate in a second fundamental frequency range when the Q factor of the second coil set 12 is greater than 0.5 within the second fundamental frequency range. FIG. 1 illustrates an instance in which the first coil set 10 contains one coil structure and the second coil set 12 also contains one coil structure. The first coil set and the second coil set may each include one or more coil structures.

Figure 2:
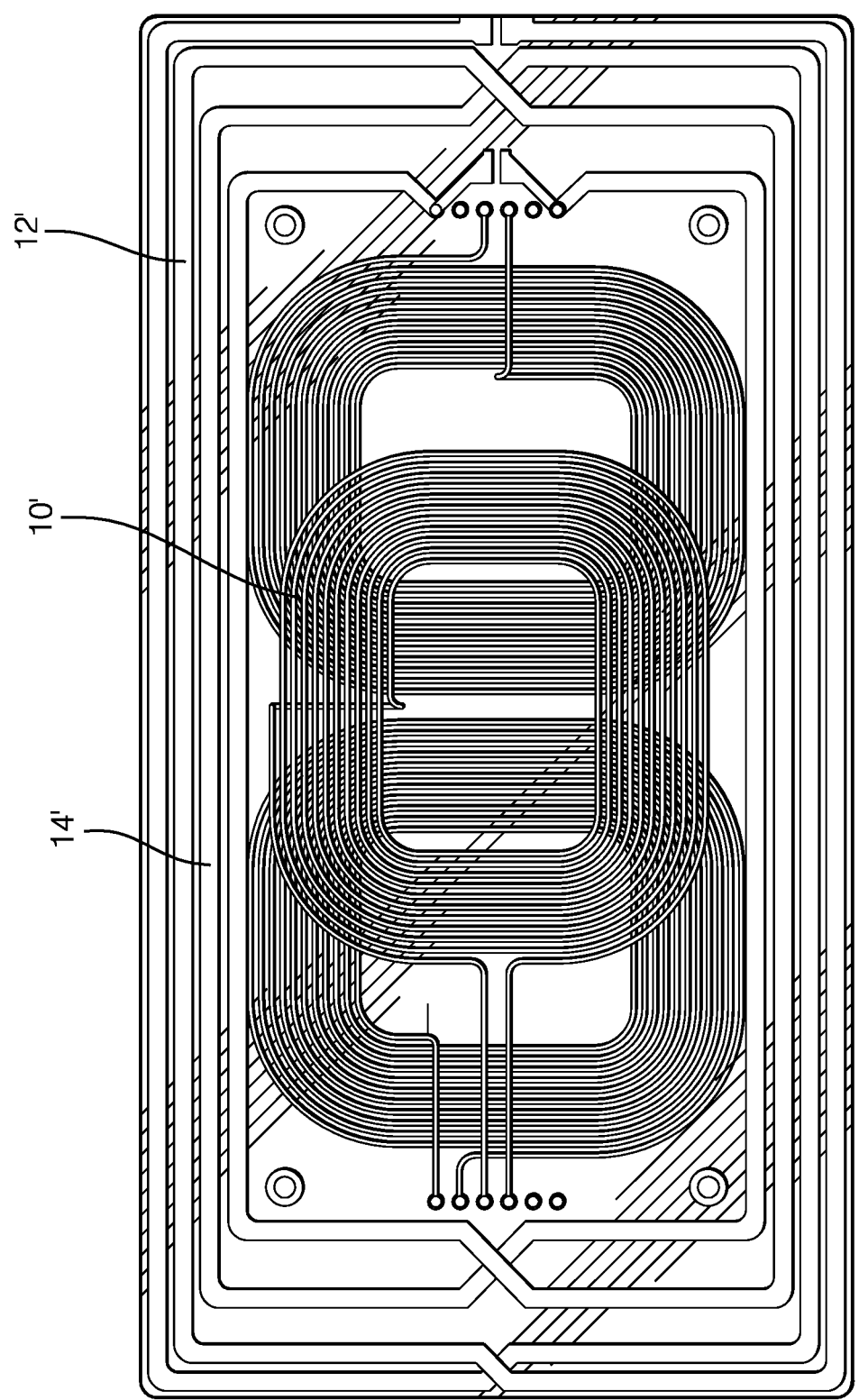
FIG. 2 is a top view of a printed circuit board on which a first and second transmit coil set are formed according to another embodiment.

FIG. 2 illustrates a non-limiting example of a first transmit coil set 10' and a second transmit coil set 12' formed by conductive traces on a printed circuit board 14' where a first transmit coil set 10' operates at a frequency that is substantially different from a frequency at which a second transmit coil set 12' operates. The first transmit coil set 10' is configured to resonate in a first fundamental frequency range and a second transmit coil set 12' is configured to resonate in a second fundamental frequency range. The second fundamental frequency range is outside of the first fundamental frequency range and is at least one order of magnitude, i.e., ten times, higher or lower than the first fundamental frequency. The first coil set 10' in this example includes three coil structures and the second coil set 12' includes one coil structure.

Figure 3:
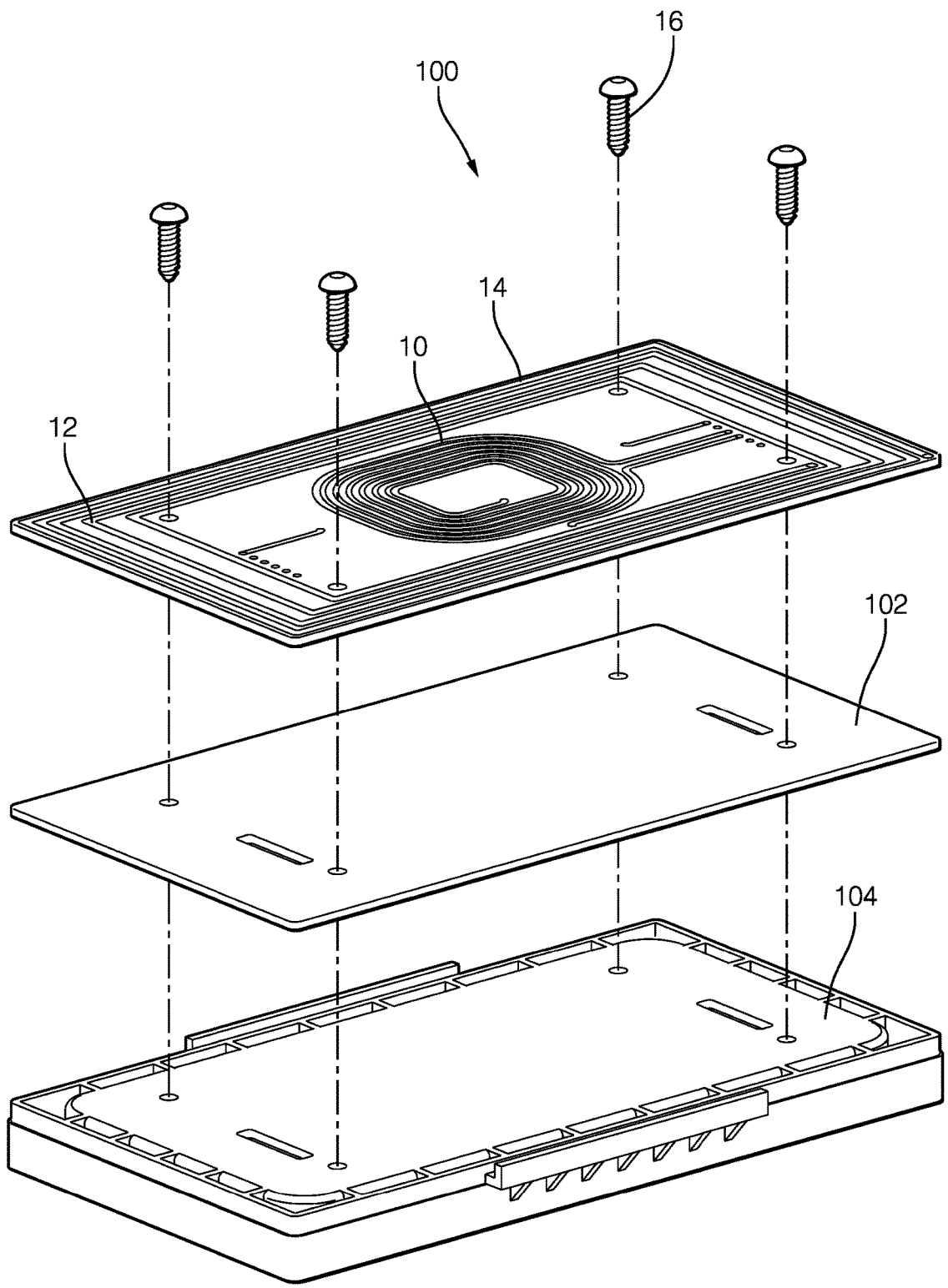
FIG. 3 is an exploded view of a coil assembly including the printed circuit board of FIG. 1 according to one embodiment.

FIG. 3 shows a non-limiting example of a transmit coil assembly 100 in which the magnetic shielding is shared by the first and second transmit coil sets 10, 12. In the transmit coil assembly 100, magnetic shielding is provided by a common ferrite shield 102 disposed between the printed circuit board 14 containing the first and second transmit coil sets 10, 12 and a housing 104 formed of a conductive material, such as an aluminum-based, copper-based, or steel-based material, in which the printed circuit board 14 is mounted by threaded fasteners 16.

Figure 4:
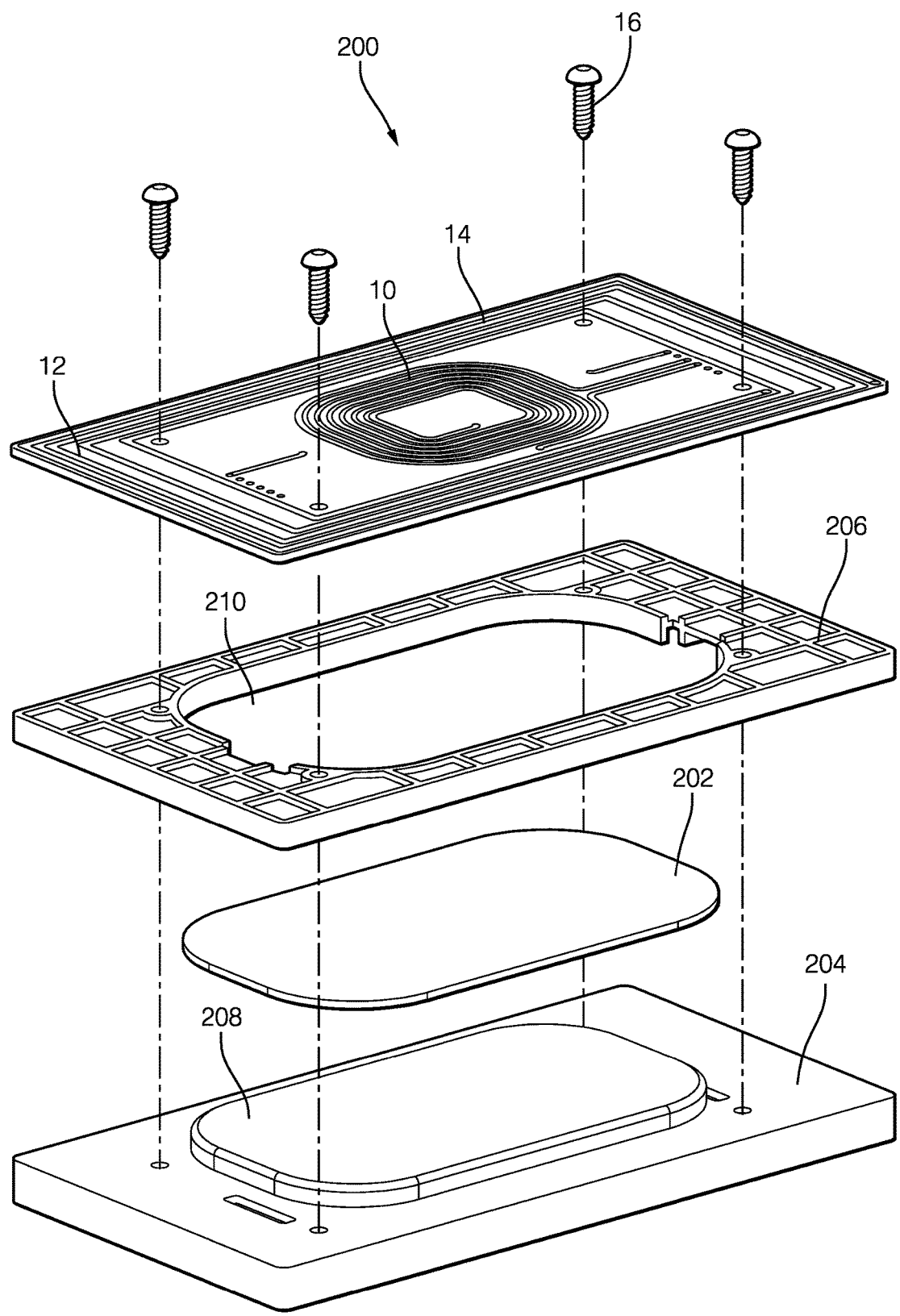
FIG. 4 is an exploded view of a coil assembly including the printed circuit board of FIG. 1 according to another embodiment.

FIG. 4 shows another non-limiting example of transmit coil assembly 200 with improved magnetic shielding performance. In the transmit coil assembly 200, the ferrite shield 202 is smaller than the common ferrite shield 102 of the transmit coil assembly 100 shown in FIG. 3. The ferrite shield 202 provides magnetic shielding substantially for only the first transmit coil set 10 by being in close proximity to the first transmit coil set 10 while the distance between the ferrite shield 202 and the second transmit coil set 12 is at least ten time the distance between the ferrite shield 202 and the first transmit coil set 10. This allows for the size and material of the ferrite shield 202 to be selected that is more ideally suited to provide magnetic shielding for the first transmit coil set 10 operating within the first frequency range. A housing 204 formed of a conductive material, such as an aluminum-based, copper-based, or steel-based material provides substantial magnetic shielding for the second transmit coil set 12 operating within the second frequency range. A spacer 206 is provided for mechanical support of the printed circuit board 14 and the ferrite shield 202. The spacer 206 can be made from a dielectric material, such as a plastic material.

In one embodiment, at least a portion of the spacer 206 may be formed of a conductive material, e.g. the same material used to form the ferrite shield 202. The material forming the spacer 206 may be selected to optimize magnetic shielding for the second transmit coil set 12 operating in the second frequency range independently of the magnetic shielding of the first transmit coil set 10 operating in the first frequency range. In an alternative embodiment, a second ferrite shield (not shown) may be placed underneath the spacer 206 intermediate the spacer and the housing 204. The printed circuit board 14 and the spacer 206 are secured to the housing 204 by the threaded fasteners 16.

The housing 204 defines a pedestal 208 beneath the first transmit coil set 10 that creates a small gap (e.g. less than 1 mm) made of material(s) not considered to be a parasitic item, e.g. the ferrite element 202 or air, between a first transmit coil set 10 and the housing 204 and a large gap (e.g. more than 3 mm) made of material(s) not considered to be a parasitic item, e.g. the spacer 206 or air, between a second transmit coil set 12 and the housing 204. The spacer 206 defines an aperture 210 extending therethrough in which the pedestal 208 and ferrite element 202 are disposed.

This transmit coil assembly 200 allows flexibility for choosing different magnetic shielding materials and configurations for independently optimizing magnetic shielding for the first and second transmit coil sets 10, 12 that may improve performance of the wireless power transmitter system.

The first transmit coil set 10, the second transmit coil set 12, the printed circuit board 14, and the treaded fasteners 16 are common to both the transmit coil assembly 100 and the transmit coil assembly 200. The reference numbers of similar elements in the embodiment of the transmit coil assembly 100 shown in FIG. 3 and the embodiment of the transmit coil assembly 200 shown in FIG. 4 differ by 100.

The magnetic shielding provides an economic solution for combining two or more transmit coils that operate at frequencies substantially different from one another in a single assembly.

While the first and second transmit coil sets 10, 12, 10', 12' in the illustrated examples are formed of conductive traces on a printed circuit board 14, 14', alternative embodiments may be envisioned in which the first and second transmit coils are formed of Litz wire, magnet wire, foil or other suitable conductive elements.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

I claim:

1. A transmit coil assembly configured to transmit two different alternating magnetic fields having different frequencies, said assembly comprising:

a first transmit coil set configured to resonate within a first frequency range;
a second transmit coil set configured to resonate within a second frequency range which is outside the first frequency range and at least ten times higher or lower than the first frequency range;
a ferrite element;
a housing formed of a conductive material in which the first transmit coil set, the second transmit coil set, and the ferrite element are disposed, wherein the ferrite element is disposed intermediate the first transmit coil set and the housing and is configured to provide magnetic shielding substantially for the first transmit coil set; and
a spacer element disposed intermediate the second transmit coil set and the housing, wherein the first coil set is spaced less than 1 millimeter from the housing and wherein the second transmit coil set is spaced at least 3 millimeters from the housing.

2. The transmit coil assembly according to claim 1, further comprising a printed circuit board, wherein the first and second transmit sets coils are formed by conductive traces on the printed circuit board.

3. The transmit coil assembly according to claim 1, wherein the spacer element is formed of a dielectric material and wherein the housing provides magnetic shielding substantially for the second transmit coil set.

4. The transmit coil assembly according to claim 3, wherein the ferrite element is not disposed intermediate the second transmit coil set and the housing.

5. The transmit coil assembly according to claim 1, wherein at least a portion of the spacer element is formed of a ferrite material and wherein the spacer element provides magnetic shielding substantially for the second transmit coil set.

* * * * *